United States Patent [19]
Kotsianas et al.

[11] Patent Number: 5,898,244
[45] Date of Patent: Apr. 27, 1999

[54] DUAL-DIRECTIONAL FIELD COIL ACTUATOR

[75] Inventors: Panajiotis Kotsianas, Redondo Beach; Stuart Reh Stampke, Northridge; Ethan Howard King, Hermosa Beach; Richard Van Allen, Beverly Hills; Fernando B. Morinigo, Los Angeles; Keith Stuart, Cypress, all of Calif.

[73] Assignee: Aura Systems, Inc., El Segundo, Calif.

[21] Appl. No.: 08/853,740

[22] Filed: May 9, 1997

Related U.S. Application Data

[63] Continuation-in-part of application No. 08/332,648, Nov. 1, 1994, abandoned, which is a continuation-in-part of application No. 08/015,217, Feb. 8, 1993, abandoned, which is a continuation-in-part of application No. 07/807,123, Dec. 13, 1991, abandoned, and application No. 07/908,453, Jul. 10, 1992, Pat. No. 5,307,665, which is a continuation-in-part of application No. 07/730,634, Jul. 16, 1991, Pat. No. 5,212,977.

[51] Int. Cl.$^6$ .......................... H02K 41/00; B21D 24/10
[52] U.S. Cl. ............................ 310/14; 310/12; 72/347
[58] Field of Search .................. 310/14, 15, 12; 72/347, 350, 430; 335/266, 268, 279, 282

[56] References Cited

U.S. PATENT DOCUMENTS

| | | | |
|---|---|---|---|
| 4,677,743 | 7/1987 | Logic | 29/596 |
| 4,808,955 | 2/1989 | Godkin et al. | 335/222 |
| 5,154,075 | 10/1992 | Hahn et al. | 72/348 |
| 5,212,977 | 5/1993 | Stuart | 72/347 |
| 5,307,665 | 5/1994 | Stuart | 72/347 |

*Primary Examiner*—Steven L. Stephan
*Assistant Examiner*—Judson H. Jones
*Attorney, Agent, or Firm*—Kathy Mojibi Kavcioglu

[57] ABSTRACT

A novel duel directional electromagnetic actuator includes a case, a core, an electrical current conductive coil and a field coil. The case includes a first case end, a second case end, and an interior wall extending between the first and second case ends. A chamber is defined by the interior wall. An electrical current conductive coil is disposed in the chamber coextensively adjacent the interior wall. The conductive coil has a first coil end disposed proximate the first case end, a second coil end disposed proximate the second case end, and a midpoint. The core has a first core end, a second core end, and an exterior wall extending between the first and second core ends. The exterior wall has a first region adjacent the first core end and a second region spaced from the first region and adjacent the second core end. The core is moveably received in the chamber with motion of the core occurring between the first and second case ends such that said first region traverses the conductive coil between the first coil end and the midpoint and the second region traverses the conductive coil between the second coil end and the midpoint. The conductive coil and the exterior wall are in a facing relationship with respect to each other. The field coil is in a spaced relationship to the conductive coil so that magnetic flux across the conductive coil between the first region and the interior wall is in a first direction and magnetic flux across the conductive coil between the second region and the interior wall is in an opposite direction. The field coil is arranged so that an electrical current in the conductive coil between the first coil end and the midpoint flows in an opposite direction than the current between the second coil end and the midpoint, whereby the flux current cross products of the flux in the first direction with the current and the flux current cross products of the flux in the second direction and said current are additive.

14 Claims, 2 Drawing Sheets

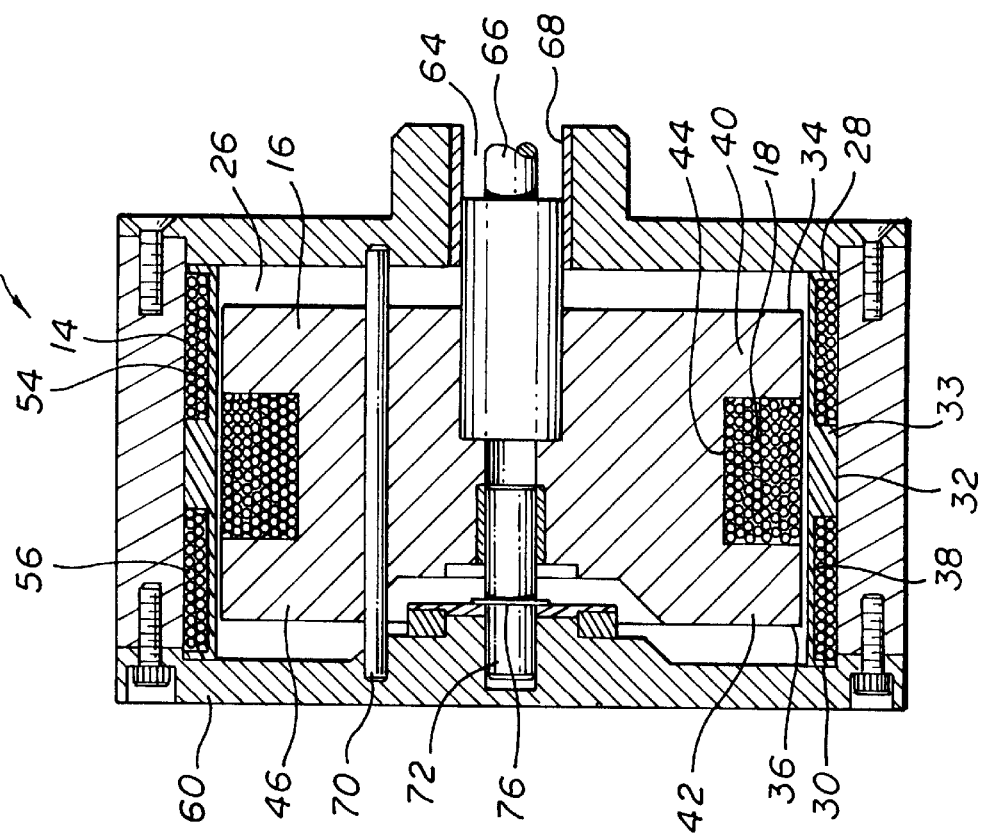
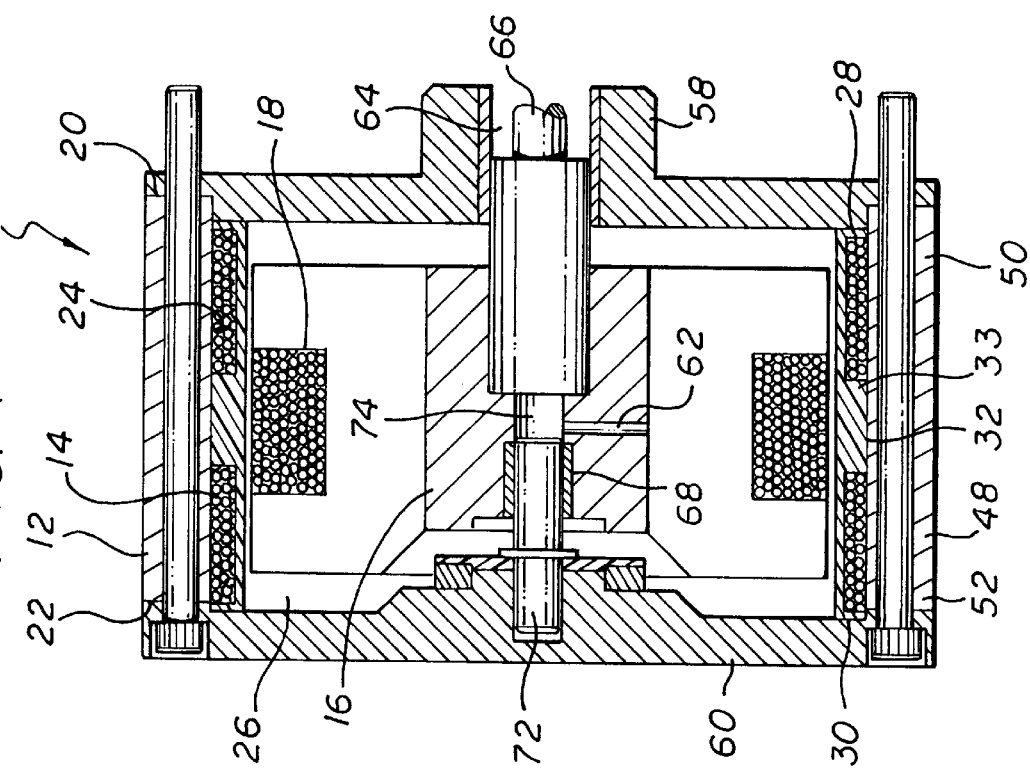

DUAL-DIRECTIONAL FIELD COIL ACTUATOR

RELATED APPLICATION DATA

The present application is a continuation in part of co-pending U.S. patent application Ser. No. 08/332,648, filed Nov. 1, 1994, now abandoned; which in turn is a continuation in part of U.S. patent application Ser. No. 08/015,217, filed Feb. 8, 1993, now abandoned; which is a continuation in part of U.S. patent application Ser. No. 07/807,123, filed on Dec. 13, 1991 and now abandoned and U.S. patent application Ser. No. 07/908,453 filed Jul. 10, 1992, now U.S. Pat. No. 5,307,665, issued May 3, 1994, which is a continuation in part of U.S. patent application Ser. No. 07/730,634 filed Jul. 17, 1991, now U.S. Pat. No. 5,212,977, issued May. 25, 1993; each of which has been assigned to the assignee of the invention described in the present application and which are incorporated herein by reference.

FIELD OF THE INVENTION

The present invention relates generally to electromagnetic actuators, and more particularly to an improved dual-directional electromagnetic.

BACKGROUND OF THE INVENTION

Electromagnetic actuators are well known. In many applications, the output force of the actuator is controlled by and is a function of an electrical control or command signal, and as such can be used in a variety of applications.

For example, as described in U.S. Pat. No. 5,187,398, issued Feb. 16, 1993 and assigned to the assignee of the invention disclosed in the present application (hereinafter the "'398 Patent"), one type of a linear electromagnetic actuator is described. The electromagnetic actuator of the '398 patent includes a magnetic flux conductive material case, an electrical current conductive coil, a magnetic flux conductive material core, and a pair of radially polarized magnetic flux developing elements. The coil is disposed in the case coextensively adjacent to its interior wall. The core is moveably received within the chamber with motion of the core occurring between the first end and the second end of the case such that a first region of the core traverses the coil between its first end and its midpoint, and a second region of the core traverses the coil between its second end and its midpoint. A first one of the magnetic elements is carried by the first region and a second one of the magnetic elements is carried by the second region so that magnetic flux across the coil between the first region and the case is in a first direction, and magnetic flux across the coil between the second region and the case is in a second direction. The coil is arranged so that an electrical current in the coil between the first coil and the midpoint flows in an opposite direction with respect to the direction of the current in the coil between the second coil and the midpoint. Therefore, the flux current cross product of the flux in the first direction with the coil current and the flux current cross product of the flux in the second direction with the coil current are additive.

Many known electromagnetic actuators use permanent magnets. Permanent magnet actuators however have several disadvantages and limitations. For example permanent magnets are fragile and are therefore unsuitable for use in actuators for rugged applications. Permanent magnets also experience a loss of polarization at high temperatures. Therefore permanent magnet actuators operating at high temperatures may experience a reduction in the flux density through the gap, thereby reducing efficiency of the actuator. Permanent magnets are also expensive, adding to the overall cost of the permanent magnet actuator.

SUMMARY OF THE INVENTION

It is therefore an object of the present invention to provide a novel dual directional electromagnetic actuator that may be subjected to high temperatures and rugged environments. It is another object of the present invention to provide a novel dual directional electromagnetic actuator which minimizes flux leakage from the core thereby maximizing efficiency.

According to one embodiment of the present invention, a novel duel directional electromagnetic actuator includes a case, a core, an electrical current conductive coil and a field coil. The case includes a first case end, a second case end, and an interior wall extending between the first and second case ends. A chamber is defined by the interior wall. An electrical current conductive coil is disposed in the chamber coextensively adjacent the interior wall. The conductive coil has a first coil end disposed proximate the first case end, a second coil end disposed proximate the second case end, and a midpoint. The core has a first core end, a second core end, and an exterior wall extending between the first and second core ends. The exterior wall has a first region adjacent the first core end and a second region spaced from the first region and adjacent the second core end. The core is movably received in the chamber with motion of the core occurring between the first and second case ends such that said first region traverses the conductive coil between the first coil end and the midpoint and the second region traverses the conductive coil between the second coil end and the midpoint. The conductive coil and the exterior wall are in a facing relationship with respect to each other. The field coil is in a spaced relationship to the conductive coil so that magnetic flux across the conductive coil between the first region and the interior wall is in a first direction and magnetic flux across the conductive coil between the second region and the interior wall is in an opposite direction. The field coil is arranged so that an electrical current in the conductive coil between the first coil end and the midpoint flows in an opposite direction than the current between the second coil end and the midpoint, whereby the flux current cross products of the flux in the first direction with the current and the flux current cross products of the flux in the second direction and said current are additive.

The feature of the present invention of using a field coil to develop the magnetic flux across the gaps of an electromagnetic actuator advantageously enables the actuator to be subjected to a wider range of temperatures than can permanent magnet type actuators, for reasons as set forth above. Furthermore, the field coil actuator may also have significant advantages in cost over the permanent magnet type actuator. For example, typical permanent magnets suitable for actuators are fabricated from NdFeB. For a given magnetic field strength, a field coil constructed of copper wire will be of lower cost than the NdFeB magnet.

The construction of the core of the novel field coil actuator disclosed herein also ensures that leakage flux is minimized. Since the field coil is substantially enclosed by the magnetic flux conductive material of the core, the core acts as a shield to minimize such leakage flux. This advantage is obtained because the flux generated by the field coil will follow the path of least resistance. The flux will therefore prefer to be confined through the core, case and gaps. The minimizing of leakage flux obviates the need for bulky shielding, and simplifies the packaging of the actuator.

BRIEF DESCRIPTION OF THE DRAWING

FIG. 1 is a cross-sectional view of the electromagnetic actuator constructed according to the principles of the present invention;

FIG. 2 is a cross-sectional view of the electromagnetic actuator constructed according to the principles of the present invention rotated at a 45 degree angle from FIG. 1;

DESCRIPTION OF AN EXEMPLARY PREFERRED EMBODIMENT

Figure 3:
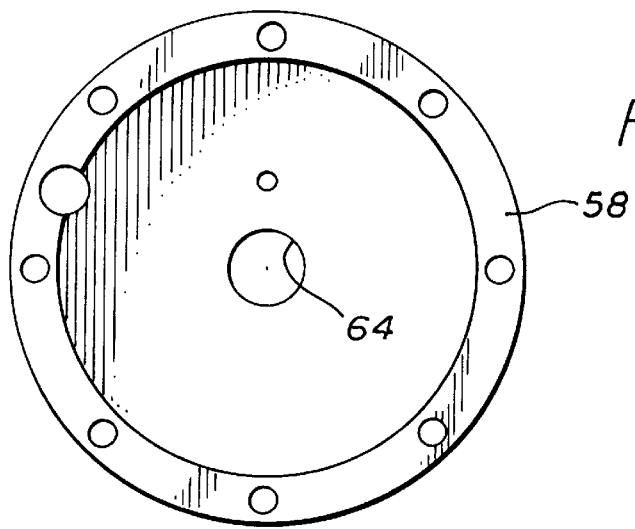
FIG. 3 is a top view of the inside of the front end cap of the actuator of FIG. 1.
Figure 4:
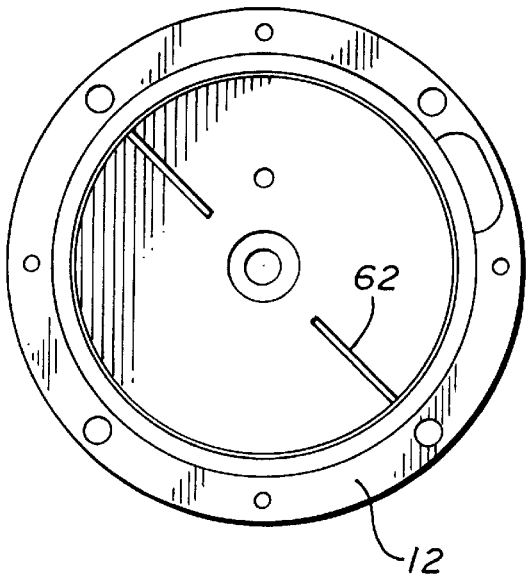
FIG. 4 is a front view of the electromagnetic actuator of the present invention with the front end cap and shaft removed.

Referring now to FIGS. 1 and 2, there is shown an electromagnetic actuator 10 constructed according to the principles of the present invention. The actuator includes a case 12, an electrical current conductive coil 14, a core 16, and a magnetic flux developing element 18. In the preferred embodiment the magnetic flux developing element 18 is a field coil. Although each of the above-mentioned elements of the actuator will be described hereinbelow as being cylindrical in construction and coaxially disposed with respect to each other, it is to be understood that other geometries which satisfy the cooperation between the elements are within the scope of the present invention.

The case 12 is an elongated cylinder fabricated from magnetic flux conductive material such as low carbon magnetic steel. The case has a first case end 20, a second case end 22, and an interior wall 24 extending axially between the first case end and the second case end. The interior wall 24 defines a chamber 26 within the cylindrical case. The case further defines a case first end region 50 adjacent the first case end 20 and a case second end region 52 adjacent the second case end 22.

The conductive coil 14 is disposed in the chamber 26 coextensively adjacent to the interior wall 24. The conductive coil 14 has a first coil end 28 disposed proximate the first case end 20 and a second coil end 30 disposed proximate the second case end 22. The coil further has a midpoint 32. The conductive coil 14 is wound on a plastic bobbin 33. As will be described in greater detail hereinbelow, the first coil end, the second coil end and the midpoint are provided so that electrical connection may be made to the conductive coil.

The core 16 is a cylinder of magnetic flux conductive material such as low carbon magnetic steel. The core has a first core end 34, a second core end 36, and a cylindrical exterior wall 38 extending between the first core end 34 and the second core end 36. The exterior wall has a first region 40 adjacent the first core end and a second region 42 adjacent the second core end. The first end region 40 and the second end region 42 extend radially outward from the center of the core 16. The exterior wall 38 defines a channel 44 intermediate the first core end and the second core end. The core 16 may also be defined as having an inner core member 46 and an outer core member 48.

The core 16 is coaxially received in the chamber 26 of the case and mounted therein in axially slidable engagement. Accordingly, the cylindrical exterior wall 38 of the core is radially facing and spaced from the conductive coil 14. Motion of the core 16 occurs between the first case end 20 and the second case end 22 such that the first region 40 traverses the conductive coil 14 in the axial direction between the first coil end 28 and the midpoint 32, and the second region 42 axially traverses the conductive coil 14 between the second coil end 30 and the midpoint 32.

Referring now to FIG. 3, the core 16 may further include one or more eddy current reduction grooves 62. The grooves 62 in the core 16 extend in a radial direction and serve to stop eddy currents.

The magnetic flux developing element or field coil 18 is disposed within the core channel 44. Therefore the field coil is in a radially facing and spaced apart relationship form the conductive coil 14. The field coil 18 is wound such that a constant DC current developed therein will develop an axial flux through the inner core member 16, the outer core member or case 12 and a substantially radially directed flux in a first direction between the core first region 40 and the case first end region 50 and a radially directed flux in the opposite direction between the core second region 42 and the case second end region 52. The field coil 18 therefore develops a closed loop flux path within the actuator 10.

The conductive coil 14 has a first coil half 54 proximately disposed to the case first end region 50 and a second coil half 56 electrically serially connected to the first coil half 54 and proximately disposed the case second end region 52. As described hereinabove, the second coil half 56 is wound counter to the first coil half 54 such that a current throughout the entire length of the conductive coil 14 is of a first polarity in the first coil half 54 and of a second, opposite polarity in the second coil half 56. Therefore, the current through the conductive coil 14 will be of proper polarity in the first coil half 54 and the second coil half 56 when intersecting the radial flux at the respective one of the first end region 50 and the second end region 52. Accordingly, the contributions to force at each of the first coil half 54 and the second coil half 56 as defined by the vector cross product of the current and flux, are additive. In operation of the actuator 10, changing direction of the current in the conductive coil causes the core to change in direction of axial movement.

Another feature of the present invention is the asymmetrical placement of the conductive coil 14 in relation to the case 12. More specifically, the conductive coil 14 preferably extends coextensively with and is in a facing relationship with the case interior wall 24. As best shown in FIG. 1, the conductive coil second end 30 aligns with the case second end 22. The conductive coil first end 28 however preferably does not align with the case first end 20. Instead, the case first end 20 extends beyond the coil first end. This asymmetrical placement of the conductive coil causes the radially directed flux to travel from the core first region 40 toward the case first end 20. This design feature is desirable to create force necessary to propel the core at the coil first end.

Referring now to FIGS. 1 and 3, the actuator 10 may further include a first or front end cap 58 and a second or rear end cap 60. Each end cap 58,60 is fabricated from nonmagnetic material. The first end cap 58 attaches to the case first end 20 and the second end cap 60 attaches to the case second end 22, as best seen in FIGS. 1 and 2. The first end cap 58 has a coaxial bore 64. A shaft 66, fabricated from nonmagnetic material, is received in axial slidable engagement within the bore. The shaft 66 is preferably formed into a portion of the core. The bore 64 and core 16 may include bearings or bushings 68 as is well known in the art. The actuator 10 may further include an anti-rotation pin 70. The pin 70 extends through the front end cap 58, the core 16 and the rear end cap 60. The pin prevents the core form rotating within the case during operation.

Figure 5:
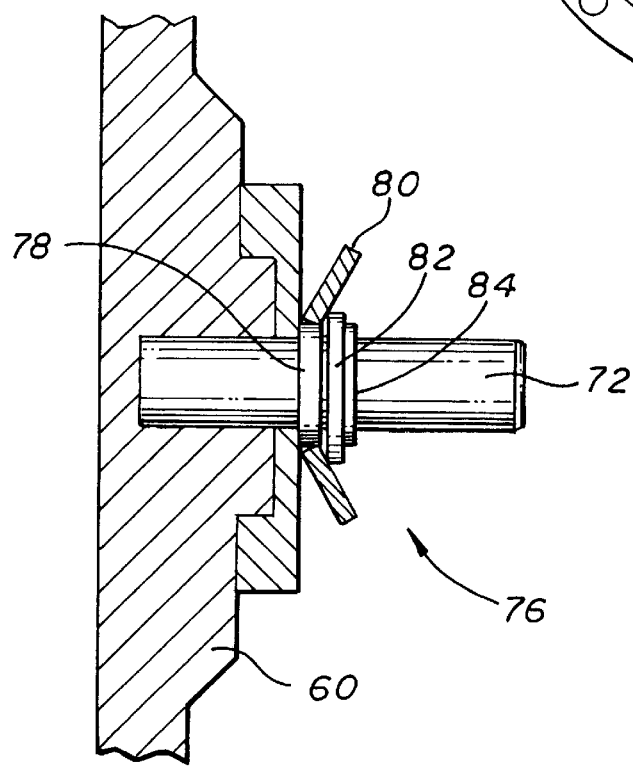
FIG. 5 is a cross-sectional view of the shock absorber assembly of the electromagnetic actuator of the present invention.

The shaft 66 is connected to a nonmagnetic pin 72 that extends into the rear end cap 60. An air gap is defined between the shaft 66 and the pin 72. The rear end cap 60 may include a shock absorbing mechanism 74, as shown in FIG. 1 and in detail in FIG. 5. The shock absorber includes a first washer 78, a stiff disk spring 80 or Bellville disk spring, a second washer 82 and a Truart snap ring 84. The washers 78, 82, spring 80 and ring 84 are coaxially mounted on the pin 72 adjacent the rear end cap 60.

There has been described hereinabove an exemplary preferred embodiment of the actuator according to the principles of the present invention. Those skilled in the art may now make numerous uses of, and departures from, the above-described embodiments without departing from the inventive concepts disclosed herein. Accordingly, the present invention is to be defined solely by the scope of the following claims.

We claim as our invention:

1. A dual directional electromagnetic actuator comprising:

an actuator core, said actuator core having an inner core member and an outer core member, said outer core member further having a first core end and a second core end;

a magnetic flux developing element, said magnetic flux developing element being intermediate said inner core and said outer core, and further wherein said magnetic flux developing element is disposed intermediate said first core end and said second core end; and a conductive coil intermediate said inner core and outer core, said coil having a first coil end disposed proximate said first core end and a second coil end disposed proximate said second core end and a midpoint and further wherein said conductive coil is wound in a first direction between said first coil end and said midpoint, and counterwound in a second direction opposite said first direction between said midpoint and said second coil end.

2. A dual directional electromagnetic actuator in accordance with claim 1 wherein said first core end extends beyond said first coil end.

3. A dual directional electromagnetic actuator in accordance with claim 1 wherein said conductive coil is in a facing relationship with said outer core member and further wherein said conductive coil is asymmetrically disposed in relation to said outer core member.

4. A dual directional electromagnetic actuator in accordance with claim 1 wherein said magnetic flux developing element is a field coil.

5. A dual directional electromagnetic actuator in accordance with claim 1 wherein said magnetic flux developing element is in a facing spaced apart relationship to said conductive coil.

6. A dual directional electromagnetic actuator in accordance with claim 1 wherein said core is cylindrical.

7. A dual directional electromagnetic actuator in accordance with claim 6 wherein said magnetic flux developing element defines an outer surface and said conductive coil defines an inner surface and further wherein said the entire outer surface is in a spaced apart facing relationship to said inner surface.

8. An electromagnetic actuator comprising:

a magnetic flux conductive material case having a first case end, a second case end, and an interior wall extending between said first case end and said second case end, and a chamber confined by said interior wall;

an electrical current conductive coil disposed in said chamber coextensively adjacent said wall, said conductive coil having a first coil end disposed proximate said first case end, the second coil end disposed proximate said second case end, and a midpoint;

a magnetic flux conductive material core having a first core end, a second core end, and an exterior wall extending between said first core end and said second core end, said exterior wall having a first region adjacent said first core end and a second region spaced from said first region adjacent said second core end, said core being moveably received in said chamber with motion of said core occurring between said first case end and said second case end such that said first region traverses said conductive coil between said first coil end and said midpoint and said second region traverses said conductive coil between said second coil end and said midpoint, said conductive coil and said exterior wall being in a facing relationship with respect to each other; and a field coil in a spaced relationship to said conductive coil so that magnetic flux across said conductive coil between said first region and said interior wall is in a first direction and magnetic flux across said conductive coil between said second region and said interior wall is in a second direction opposite said first direction, said field coil being arranged so that an electrical current in said conductive coil between said first coil end and said midpoint flows in an opposite direction with respect to the direction of said current in said conductive coil between said second coil end and said midpoint whereby the flux current cross products of said flux in said first direction with said current and the flux current cross products of said flux in said second direction and said current are additive.

9. An electromagnetic actuator in accordance with claim 8 wherein said first core end extends beyond said first coil end.

10. An electromagnetic actuator in accordance with claim 8 wherein said conductive coil is in a facing relationship with said case interior wall and further wherein said conductive coil is asymmetrically disposed in relation to said case interior wall.

11. An electromagnetic actuator is set forth in claim 8 wherein said coil is wound in a first direction between said first coil end and said midpoint, and counterwound in a second direction between said midpoint and said second coil end, and includes a current input at said first coil end and a current return at said second coil end.

12. An electromagnetic actuator in accordance with claim 8 wherein said field coil is in a facing spaced apart relationship to said conductive coil.

13. An electromagnetic actuator in accordance with claim 8 wherein said case and said core are cylindrical.

14. An electromagnetic actuator in accordance with claim 8 wherein said field coil defines an outer surface and said conductive coil defines an inner surface and further wherein said the entire outer surface is in a spaced apart facing relationship to said inner surface.

\* \* \* \* \*